US011131388B2

(12) United States Patent
Peters (10) Patent No.: US 11,131,388 B2
(45) Date of Patent: Sep. 28, 2021

(54) SEAL ASSEMBLY SEAL LAND WITH A GAS FLOW PASSAGE

(71) Applicant: United Technologies Corporation, Farmington, CT (US)

(72) Inventor: Robert E. Peters, Portland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 73 days.

(21) Appl. No.: 16/594,169

(22) Filed: Oct. 7, 2019

(65) Prior Publication Data

US 2020/0400039 A1 Dec. 24, 2020

Related U.S. Application Data

(60) Provisional application No. 62/864,806, filed on Jun. 21, 2019.

(51) Int. Cl.
*F16J 15/34* (2006.01)
*F01D 25/18* (2006.01)
*F16J 15/30* (2006.01)
*F16C 19/06* (2006.01)
*F16C 33/72* (2006.01)

(52) U.S. Cl.
CPC ........ *F16J 15/3404* (2013.01); *F01D 25/183* (2013.01); *F05D 2220/32* (2013.01); *F05D 2240/55* (2013.01); *F16C 19/06* (2013.01); *F16C 33/726* (2013.01); *F16J 15/30* (2013.01)

(58) Field of Classification Search
CPC ...... F16J 15/30; F16J 15/3404; F16C 33/726; F01D 25/183; F01D 25/186; F05D 2260/6022
See application file for complete search history.

(56) References Cited

U.S. PATENT DOCUMENTS

| 3,964,753 | A | | 6/1976 | Junker et al. | |
|---|---|---|---|---|---|
| 4,398,730 | A | | 8/1983 | Rucker | |
| 4,406,459 | A | | 9/1983 | Davis et al. | |
| 4,406,460 | A | * | 9/1983 | Slayton | F16J 15/164 277/401 |
| 4,928,978 | A | * | 5/1990 | Shaffer | F01D 25/183 277/401 |

(Continued)

FOREIGN PATENT DOCUMENTS

| GB | 2532197 A | * | 5/2016 | ........... F01D 25/183 |
|---|---|---|---|---|
| JP | 2002266876 A | * | 10/2002 | ............ F16C 33/667 |

OTHER PUBLICATIONS

EP search report for EP20180689.0 dated Oct. 29, 2020.

*Primary Examiner* — Igor Kershteyn
*Assistant Examiner* — Topaz L. Elliott
(74) *Attorney, Agent, or Firm* — Getz Balich LLC (57) ABSTRACT

An assembly is provided for a piece of rotational equipment. This assembly includes a stationary component, a rotating component, and a dry seal assembly. The dry seal assembly is configured to substantially seal an annular gap between the stationary component and the rotating component. The dry seal assembly includes a seal element and a seal land. The seal element is mounted to the stationary component and is configured to sealingly engage the seal land. The seal land is mounted to the rotating component and is configured to permit gas leakage across the dry seal assembly through a passageway in the seal land.

19 Claims, 8 Drawing Sheets

(56) References Cited

U.S. PATENT DOCUMENTS

| | | | |
|---|---|---|---|
| 5,464,227 A | 11/1995 | Olson | |
| 5,658,127 A | 8/1997 | Bond et al. | |
| 7,780,399 B1 * | 8/2010 | Garrison | F01D 25/183 |
| | | | 415/1 |
| 8,845,282 B2 | 9/2014 | LaPierre et al. | |
| 8,920,034 B2 | 12/2014 | Galivel | |
| 9,039,014 B2 * | 5/2015 | Pekris | F16J 15/406 |
| | | | 277/431 |
| 2013/0078079 A1 | 3/2013 | LaPierre | |
| 2016/0025140 A1 | 1/2016 | Walker | |
| 2018/0045316 A1 * | 2/2018 | Kovacik | F16J 15/324 |
| 2019/0017414 A1 | 1/2019 | Vdoviak et al. | |
| 2020/0271013 A1 * | 8/2020 | Zelesky | F01D 25/12 |

* cited by examiner

FIG. 11

SEAL ASSEMBLY SEAL LAND WITH A GAS FLOW PASSAGE

CROSS-REFERENCE TO RELATED APPLICATIONS

This application claims priority to U.S. Provisional Patent Appln. No. 62/864,806 filed Jun. 21, 2019, which is hereby incorporated herein by reference in its entirety.

BACKGROUND OF THE DISCLOSURE

1. Technical Field

This disclosure relates generally to rotational equipment and, more particularly, to a seal assembly for rotational equipment such as, for example, a gas turbine engine.

2. Background Information

A bearing of a gas turbine engine may rotatably support a rotating component such as a shaft relative to a stationary component. The bearing is typically located within a bearing compartment of the gas turbine engine. This bearing compartment may be fluidly decoupled from another engine environment by a plurality of seals. In order to maintain an air pressure within the bearing compartment, the shaft may be configured with an airflow aperture. This airflow aperture may provide a bypass around at least one of the seals, and may direct and meter air into the bearing compartment from the other engine environment. However, such an airflow aperture in the shaft is susceptible to flowing lubricant out of the bearing compartment under certain conditions, which escaped lubricant may collect within a bore of the shaft. There is a need in the art therefore for an improved method of directing air into a bearing compartment while reducing the potential of escaping lubricant.

SUMMARY OF THE DISCLOSURE

According to an aspect of the present disclosure, an assembly is provided for a piece of rotational equipment. This assembly includes a stationary component, a rotating component and a dry seal assembly. The dry seal assembly is configured to substantially seal an annular gap between the stationary component and the rotating component. The dry seal assembly includes a seal element and a seal land. The seal element is mounted to the stationary component and is configured to sealingly engage the seal land. The seal land is mounted to the rotating component and is configured to permit gas leakage across the dry seal assembly through a passageway in the seal land.

According to another aspect of the present disclosure, another assembly is provided for a piece of rotational equipment. This assembly includes a seal land and a seal element. The seal land includes a seal land surface and a passageway. The seal land surface is arranged at a side of the seal land and extends circumferentially around an axis. The passageway extends through the seal land from an inlet at the side of the seal land. The seal element includes a seal element surface. The seal element is configured such that an entirety of the seal element surface sealing engages a portion of the seal land surface to form a seal interface between the seal element and the seal land. The seal land is rotatable about the axis relative to the seal element. The portion of the seal land surface is circumferentially uninterrupted.

According to still another aspect of the present disclosure, another assembly is provided for a piece of rotational equipment. This assembly includes a seal land and a seal element. The seal land includes a seal land surface and a passageway. The seal land surface is arranged at an axial side of the seal land and extends circumferentially around an axis. The passageway extends through the seal land from an inlet at the axial side of the seal land. The seal element includes a seal element surface. The seal element is configured such that the seal element surface sealing engages a portion of the seal land surface to form a seal interface between the seal element and the seal land. The seal land is rotatable about the axis relative to the seal element. The portion of the seal land surface is circumferentially uninterrupted. A radial height of the seal element surface is equal to a radial height of the portion of the seal land surface.

The passageway may include a plurality of apertures within the seal land. The plurality of apertures may be arranged in an annular array.

The passageway may further include an annular groove fluidly coupled with the plurality of apertures.

The rotating component may be configured to rotate about an axis. The seal land may extend axially along the axis to an axial side. The seal land may extend radially, relative to the axis, to a radial outer side. The annular groove may be located at the axial side. An end orifice of a first of the plurality of apertures may be located at the radial outer side.

The rotating component may be configured to rotate about an axis. The seal land may extend axially along the axis to an axial side. The seal land may extend radially, relative to the axis, to a radial outer side. A first end orifice of a first of the plurality of apertures may be located at the axial side. A second end orifice of the first of the plurality of apertures may be located at the radial outer side.

The rotating component may be configured to rotate about an axis. The passageway may extend through the seal land from an inlet to an outlet. The inlet of the passageway may be located radially inboard, relative to the axis, of an interface between the seal land and the seal element.

The seal element may be configured as or otherwise include a carbon seal element.

The seal land may be configured with a seal land surface. The seal element may be configured with a seal element surface. The seal element surface may sealingly engage a portion of the seal land surface to form a seal interface between the seal element and the seal land. The portion of the seal land surface may be circumferentially uninterrupted.

The seal element surface may have a radial height that is equal to a radial height of the seal land surface.

The seal element may engage the seal land in an axial direction.

The piece of rotational equipment may be configured as or otherwise include or be included in a gas turbine engine.

The seal land and the seal element may be configured to form a dry seal assembly.

The passageway may include a plurality of apertures within the seal land. The plurality of apertures may be arranged in an annular array about the axis.

The passageway may further include a groove fluidly coupled with the plurality of apertures and that extends circumferentially about the axis.

The groove may be arranged at the side of the seal land.

The element may engage the seal land in an axial direction.

The assembly may include a first component of a gas turbine engine and a second component of the gas turbine engine. The first component may be configured to rotate about the axis relative to the second component. The seal land may be attached to the first component. The seal element may be attached to the second component.

The foregoing features and the operation of the invention will become more apparent in light of the following description and the accompanying drawings.

DETAILED DESCRIPTION

Figure 1:
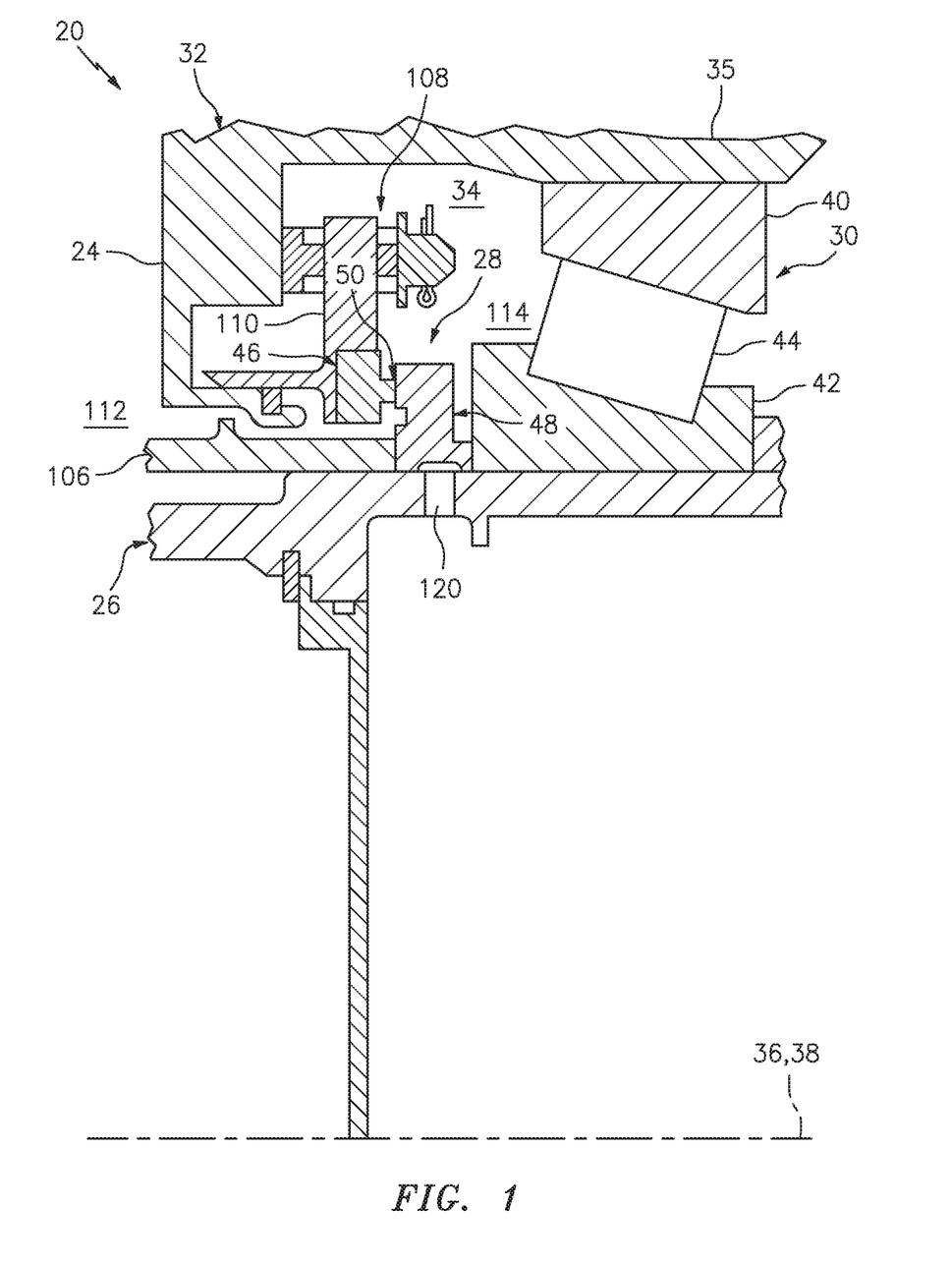
FIG. 1 is a partial side sectional illustration of an assembly for a piece of rotational equipment such a gas turbine engine.
Figure 2:
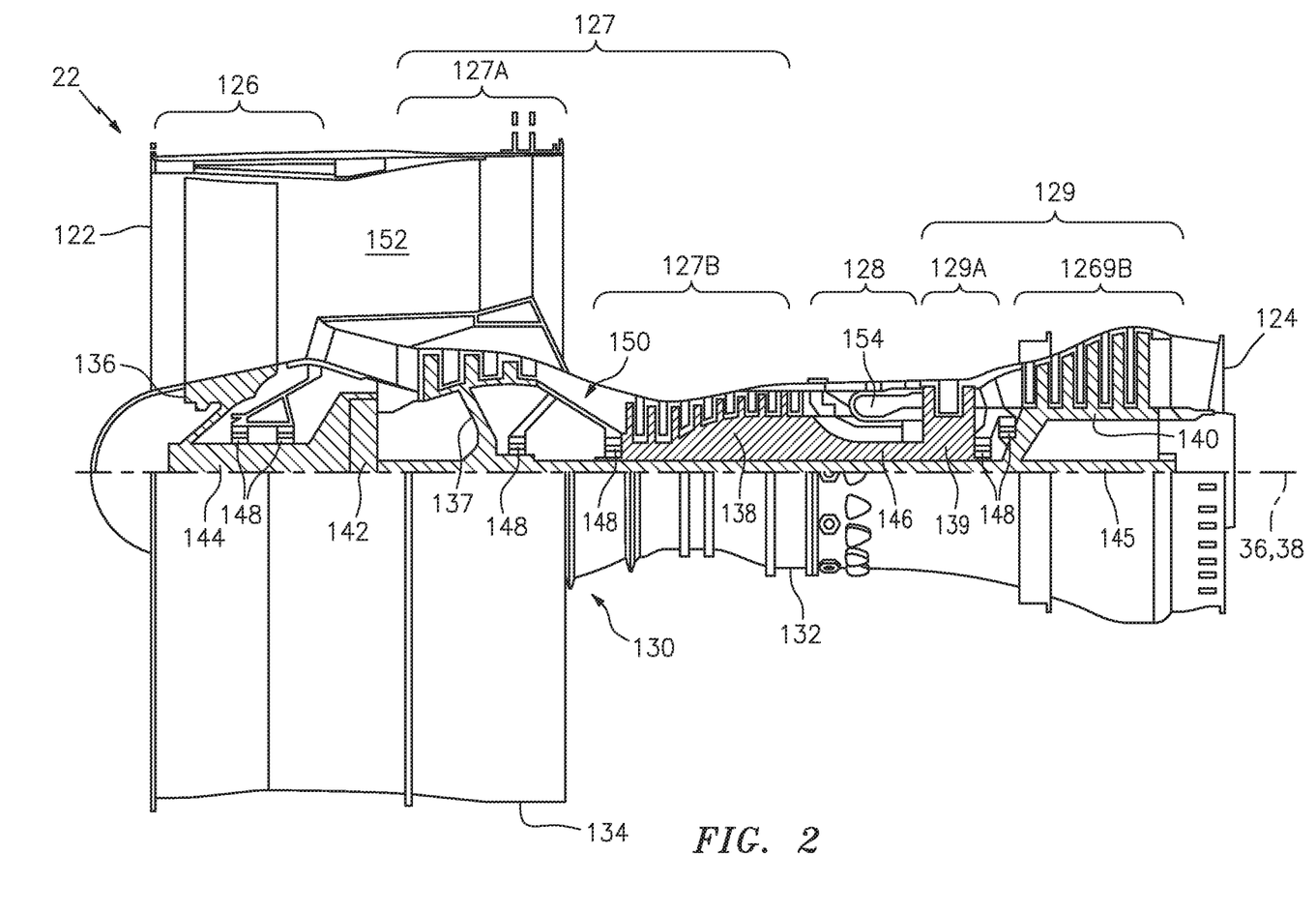
FIG. 2 is a side cutaway illustration of the gas turbine engine.

FIG. 1 is a partial side sectional illustration of an assembly 20 for a piece of rotational equipment. For ease of description, this piece of rotational equipment is referred to below as a gas turbine engine 22, an exemplary embodiment of which is shown in FIG. 2. The present disclosure, however, is not limited to any particular types or configurations of rotational equipment. The piece of rotational equipment, for example, may alternatively be configured as a wind, water or steam turbine, a rotary internal combustion engine or any other piece of rotational equipment in which a gap is sealed between two components that move relative to one another.

Referring again to FIG. 1, the assembly 20 includes a stationary component 24, a rotating component 26 and a seal assembly 28 configured to substantially seal a (e.g., annular) gap between the stationary component 24 and the rotating component 26. The assembly 20 of FIG. 1 also includes a bearing 30.

The stationary component 24 of FIG. 1 is configured as a portion of a stationary structure 32 (e.g., housing). This stationary structure 32 is configured to form a bearing compartment 34 that houses the bearing 30 within the gas turbine engine 22. The stationary structure 32 may also be configured with or otherwise be connected to a bearing support structure 35 such as, but not limited to, a strut assembly.

The rotating component 26 of FIG. 1 is rotatable about a rotational axis 36 of the assembly 20, which axis 36 may be coaxial with an axial centerline 38 of the gas turbine engine 22. The rotating component 26 of FIG. 1 is configured as a tubular engine shaft. However, in other embodiments, the rotating component 26 may be configured as another component (e.g., a sleeve) mounted to and rotatable with an engine shaft, or any other rotor within the gas turbine engine 22/rotational equipment.

The bearing 30 is configured to rotatably support the rotating component 26 relative to the stationary structure 32. The bearing 30 may be configured as a roller element bearing. The bearing 30 of FIG. 1, for example, includes an annular outer race 40, an annular inner race 42 and a plurality of bearing elements 44; e.g., cylindrical or spherical elements. The outer race 40 circumscribes the inner race 42 and the bearing elements 44. The outer race 40 is mounted to the stationary structure 32. The inner race 42 circumscribes and is mounted to the rotating component 26. The bearing elements 44 are arranged in an annular array about the axis 36, which array is radially between and engaged with the outer race 40 and the inner race 42. The present disclosure, of course, is not limited to the foregoing exemplary bearing configuration. For example, in other embodiments, the bearing 30 may be configured as a journal bearing or any other type of bearing utilized in the gas turbine engine 22.

Figure 3:
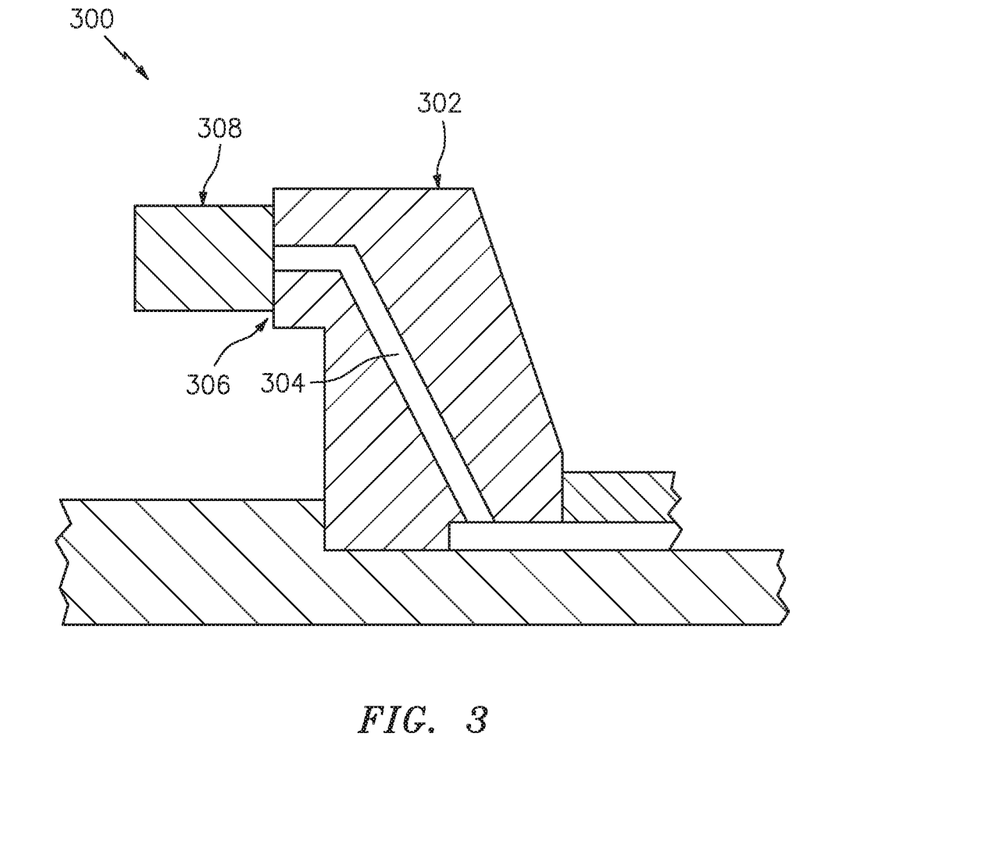
FIG. 3 is a partial side sectional illustration of a wet seal assembly.

The seal assembly 28 includes a (e.g., annular) seal element 46 and a (e.g., annular) seal land 48. The seal assembly 28 of FIG. 1 is configured as a dry seal assembly; e.g., a dry face seal assembly. The seal assembly 28 of FIG. 1, for example, is configured with a substantially dry seal interface 50 between the seal element 46 and the seal land 48. The seal assembly 28 is thereby configured to have no liquid, or very little liquid (e.g., unintentional liquid seepage), at the seal interface 50 between the seal element 46 and the seal land 48. By contrast, FIG. 3 illustrates a wet seal assembly 300 in which a seal land 302 includes one or more liquid passages 304 for directing liquid such as lubricant and/or coolant to a wet seal interface 306 between a seal element 308 and the seal land 302.

Figure 4:
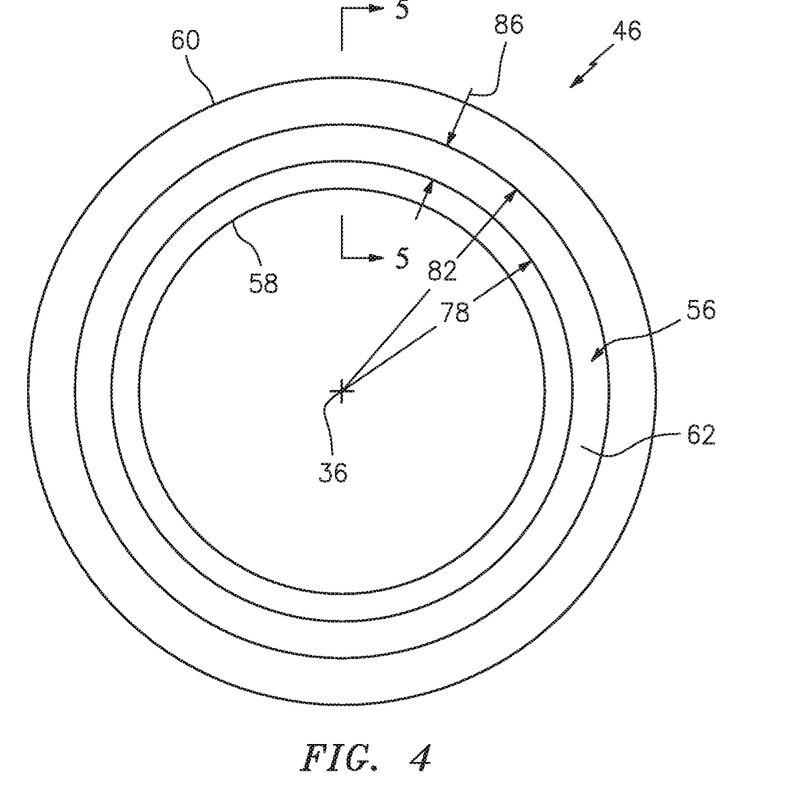
FIG. 4 is a view of a second side of a seal element for a dry seal assembly.
Figure 5:
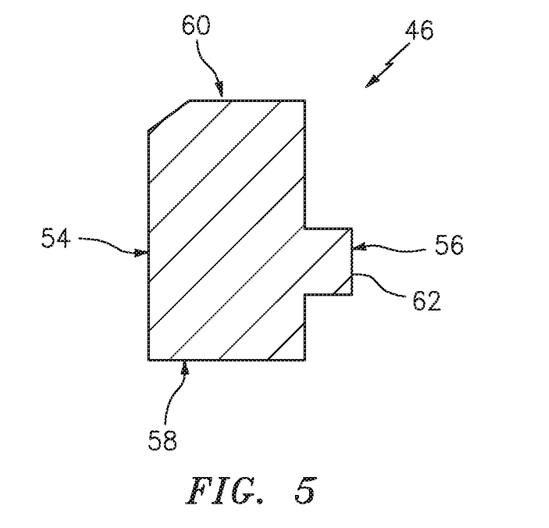
FIG. 5 is a partial sectional illustration of the seal element taken along line 5-5 in FIG. 4.

Referring to FIGS. 4 and 5, the seal element 46 may be a carbon seal element configured with a full hoop body that extends circumferentially around the axis 36. This full hoop body may be a single unitary body; e.g., a monolithic body. Alternatively, referring to FIG. 6, the full hoop body may be a segmented body. For example, the seal element 46 may be configured from an array of arcuate seal element segments 52, which segments 52 are arranged end-to-end circumferentially about the axis 36. Referring again to FIGS. 4 and 5, the seal element 46 extends axially along the axis 36 between an axial first side 54 and an axial second side 56. The seal element 46 extends radially between a radial inner side 58 and a radial outer side 60.

Figure 6:
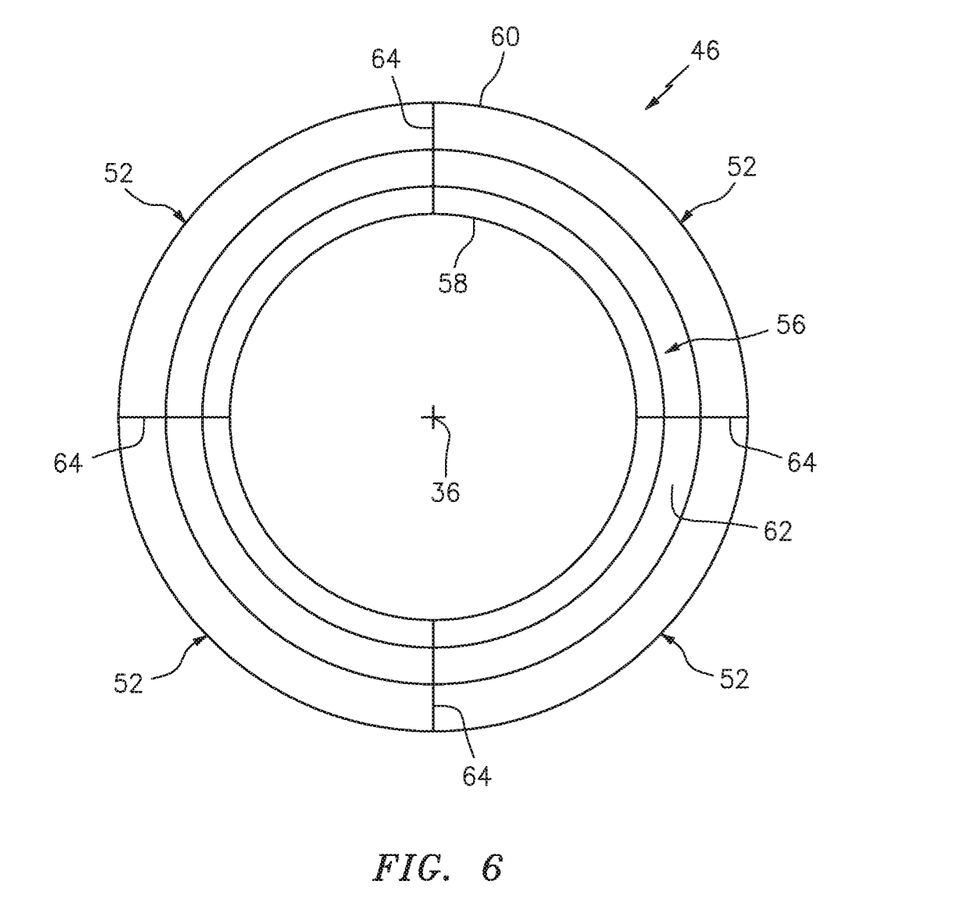
FIG. 6 is a view of a second side of another seal element for the dry seal assembly.

The seal element 46 of FIGS. 4 and 5 includes an annular, radially extending seal element surface 62. This seal element surface 62 is located at (e.g., on, adjacent or proximate) the axial second side 56. The seal element surface 62 may be an uninterrupted surface. The seal element surface 62, for example, may be a flat planar surface configured without circumferential and/or radial interruptions such as, but not limited to, channels, slots and orifices. Of course, such an uninterrupted surface may (or may not) include inter-segment lines 64 (e.g., split lines) between adjacent segments 52 where the seal element 46 includes circumferential segments as shown in FIG. 6. The present disclosure, however, is not limited to including such uninterrupted seal element surfaces. For example, in other embodiments, the seal element surface 62 may be circumferentially and/or radially interrupted by one or more channels, slots, orifices and/or other types of surface interruptions in other embodiments.

Figure 7:
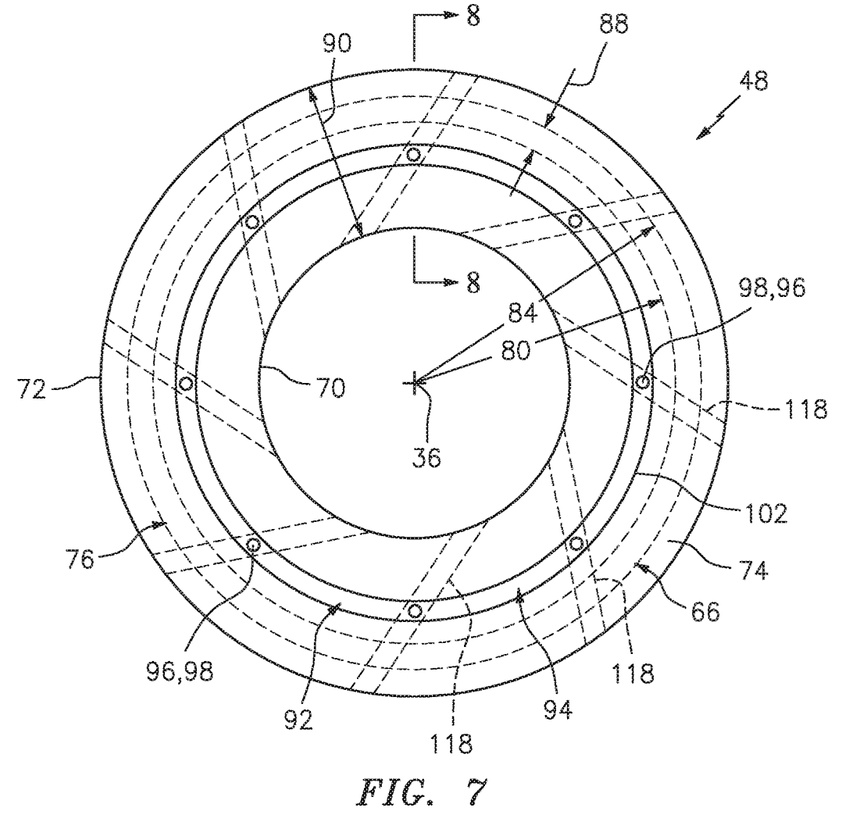
FIG. 7 is a view of a first side of a seal land for the dry seal assembly.
Figure 8:
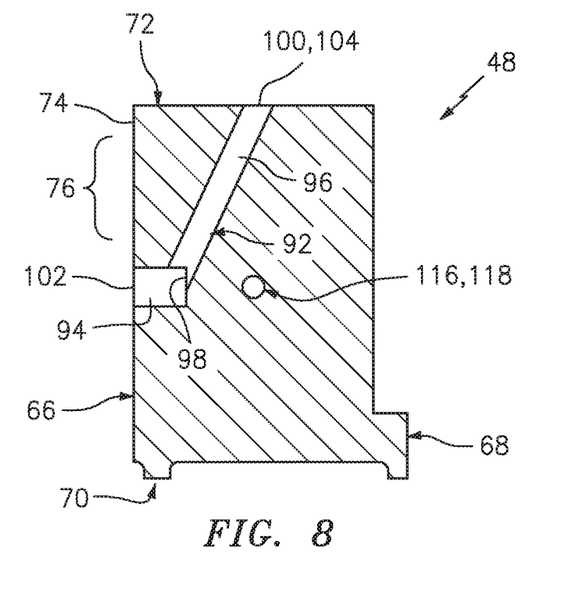
FIG. 8 is a partial sectional illustration of the seal land taken along line 8-8 in FIG. 7.

Referring to FIGS. 7 and 8, the seal land 48 is configured with a full hoop body that extends circumferentially around the axis 36. The full hoop body of the seal land 48 in FIG. 7 is a single unitary body; e.g., a monolithic body. The seal land 48 extends axially along the axis 36 between an axial first side 66 and an axial second side 68. The seal land 48 extends radially between a radial inner side 70 and a radial outer side 72.

The seal land 48 of FIGS. 7 and 8 includes an annular, radially extending seal land surface 74. This seal land surface 74 is located at (e.g., on, adjacent or proximate) the axial first side 66. At least a portion 76 (e.g., an annular portion), or alternatively an entirety, of the seal land surface 74 is an uninterrupted surface. At least the portion 76 of the seal land surface 74, for example, may be a flat planar surface configured without circumferential and/or radial interruptions such as, but not limited to, channels, slots and orifices.

A geometry and location of the portion 76 of the seal land surface 74 is selected to correspond to the geometry and location of the seal element surface 62; e.g., see FIGS. 4, 5, 7, 8 and 9. For example, referring to FIGS. 4 and 7, both the seal element surface 62 and the seal land surface 74 have corresponding (e.g., the same) circular annular shapes. A radius 78 of an inner end of the seal element surface 62 may be equal to a radius 80 of an inner end of the portion 76 of the seal land surface 74. Similarly, a radius 82 of an outer end of the seal element surface 62 may be equal to a radius 84 of an outer end of the portion 76 of the seal land surface 74. Thus, a width 86 (e.g., radial height) of the seal element surface 62 may be equal to a width 88 (e.g., a radial height) of the portion 76 of the seal land surface 74, where the width 86 extends radially between the inner and the outer ends of the seal element surface 62 and the width 88 extends radially between the inner and the outer ends of the seal land surface portion 76. The seal land surface 74, however, may also include a second portion (e.g., an annular inner portion) and/or a third portion (e.g., an annular outer portion) such that a width 90 (e.g., a radial height) of the entire seal land surface 74 may be greater than the width 86 of the entire seal element surface 62. As a result, the seal land 48 may maintain full sealing engagement (e.g., contact) with the seal land surface 74 as described below (see also FIG. 9) even where there are radial shifts between the seal assembly components 46 and 48.

Referring to FIGS. 7 and 8, the seal land 48 is configured with an internal seal land passageway 92; e.g., an air path. The passageway 92 of FIGS. 7 and 8 includes/is formed by a (e.g., annular) groove 94 and one or more apertures 96; e.g., through-holes and/or drill holes.

The groove 94 is arranged at the axial first side 66 and radially inboard of the portion 76 of the seal land surface 74. In particular, the groove 94 of FIGS. 7 and 8 extends axially along the axis 36 into the seal land 48 from the seal land surface 74 to a distal groove end surface. The groove 94 extends radially within the seal land 48 between inner and outer groove side surfaces; e.g., opposing annular surfaces. The groove 94 extends circumferentially within the seal land 48 (e.g., completely) around the axis 36.

The apertures 96 are arranged in an annular array about the axis 36. Each aperture 96 is fluidly coupled with the groove 94. In particular, each aperture 96 extends through the seal land 48 from a first end (e.g., inlet) orifice 98 at the distal groove end surface and, thus, fluidly coupled with the groove 94 to a second end (e.g., outlet) orifice 100. The second end orifices 100 (one visible in FIG. 7) are arranged at the radial outer side 72.

With the configuration of FIGS. 7 and 8, the passageway 92 extends through the seal land 48 from an inlet 102 in the seal land surface 74 at the axial first side 66 to an outlet 104 at another surface (e.g., a cylindrical surface) of the seal land 48 at the radial outer side 72. The inlet 102 is formed by the groove 94 and, thus, is radially inboard of the seal land surface portion 76. The outlet 104 is formed by the second end orifices 100 in combination and, thus, is radially outboard of the seal land surface portion 76. The seal element 46 of the present disclosure, however, is not limited to the foregoing exemplary configuration. For example, in other embodiments, the second end orifice 100 of one, some or each of the apertures 96 may be arranged at another side of the seal land 48; e.g., the axial second side 68.

Referring to FIG. 1, the seal land 48 is configured rotatable with the rotating component 26. For example, the seal land 48 is mounted to the rotating component 26 and stacked (e.g., sandwiched) axially between the inner race 42 of the bearing 30 and another rotating component 106; e.g., a tubular sleeve. The body of the seal land 48 extends circumferentially around the rotating component 26.

Figure 9:
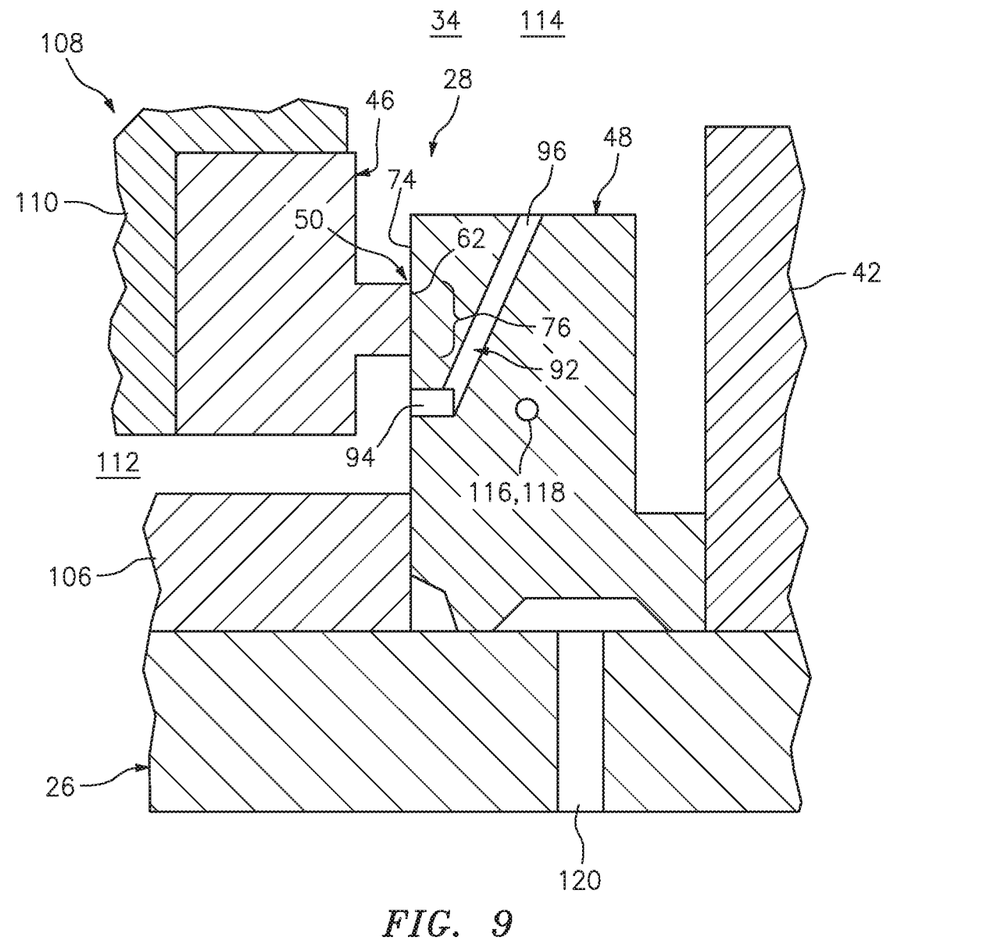
FIG. 9 is a partial side illustration of a portion of the assembly of FIG. 1 which includes the dry seal assembly.

The seal element 46 is mated with a seal element support assembly 108. For example, the seal element 46 of FIG. 1 circumscribes the rotating components 26 and 106 and is mounted to a seal element carriage 110 such that the seal element surface 62 is aligned with the seal land surface portion 76; see FIG. 9. This seal element carriage 110 is configured to translate axially along the axis 36 and is biased in an axial direction towards the seal land 48 by one or more biasing elements; e.g., springs (not visible in FIG. 1). Referring to FIG. 9, the seal element support assembly 108 is thereby configured to maintain the seal interface 50 between the seal element 46 and the seal land 48 and, more particularly, a sealing engagement (e.g., contact) between, for example, an entirety of the seal element surface 62 and an entirety of the seal land surface portion 76.

The seal interface 50 between the seal assembly components 46 and 48 is operable to substantially seal the gap between the rotating component 26 and the stationary component 24. For example, the seal interface 50 may decrease gas flow (e.g., airflow) through the gap by at least ninety or ninety-five percent (90-95%). However, the seal land 48 is configured to permit a relatively small amount of gas (e.g., air) leakage across the seal assembly 28. In particular, the passageway 92 of FIG. 9 is configured to direct gas leakage from a plenum outside 112 of the bearing compartment 34 to a plenum 114 within the bearing compartment 34. The passageway 92 thereby enables maintenance of a select gas pressure within the bearing compartment 34. It is worth noting, since liquid such as coolant and/or lubricant is not provided to the interface 50 between the seal assembly components 46 and 48, little or no liquid flows through the passageway 92. Thus, the passageway 92 may be referred to as a gas flow passageway or an airflow passageway.

Referring to FIGS. 7 and 8, in some embodiments, the seal land 48 may include at least one additional passageway 116; e.g., a liquid passageway. This passageway 116 may include/be formed by one or more apertures 118. The apertures 118 are arranged in a circumferential array about the axis 36. Each aperture 118 extends radially through the seal land 48 from an inlet orifice to an outlet orifice. The inlet orifices are arranged at the radial inner side 70. The outlet orifices are arranged at the radial outer side 72. Each aperture 118 is configured to receive liquid (e.g., lubricant and/or coolant) from, for example, an aperture 120 (see FIGS. 1 and 9) in the rotating component 26 and direct that liquid radially outward and into the bearing compartment 34. The liquid is thereby operable to cool the seal land 48 during gas turbine engine 22 operation.

Figure 10:
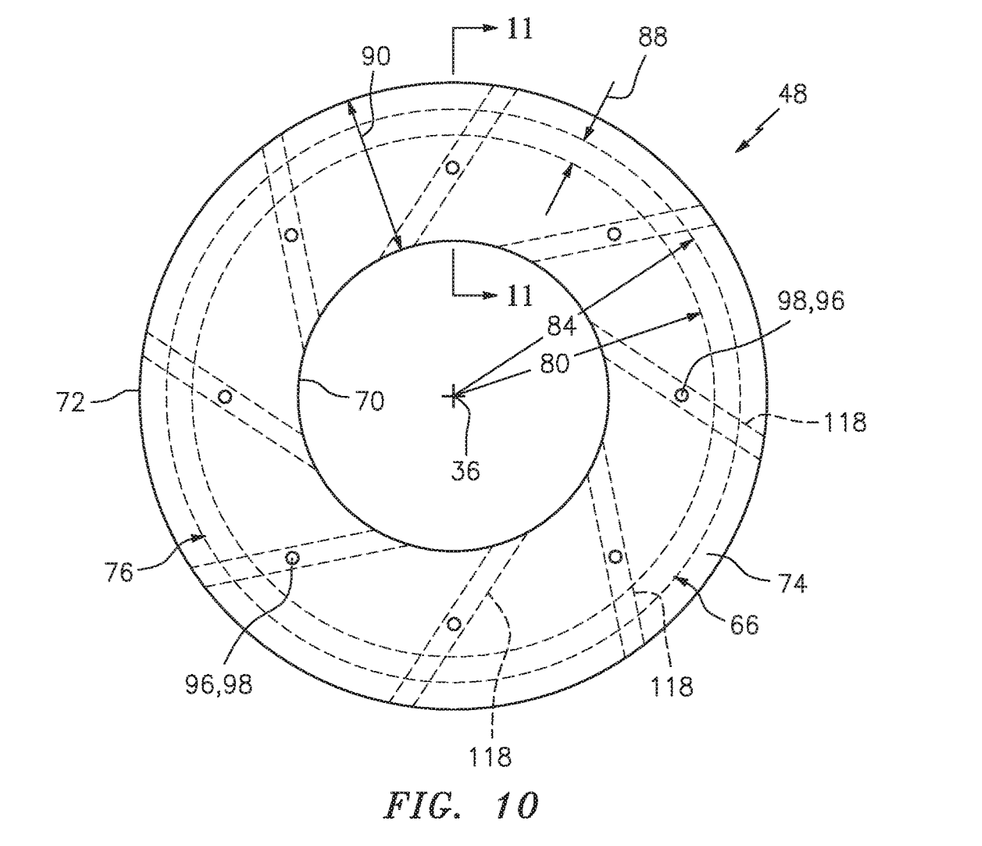
FIG. 10 is a view of a first side of another seal land for the dry seal assembly.
Figure 11:
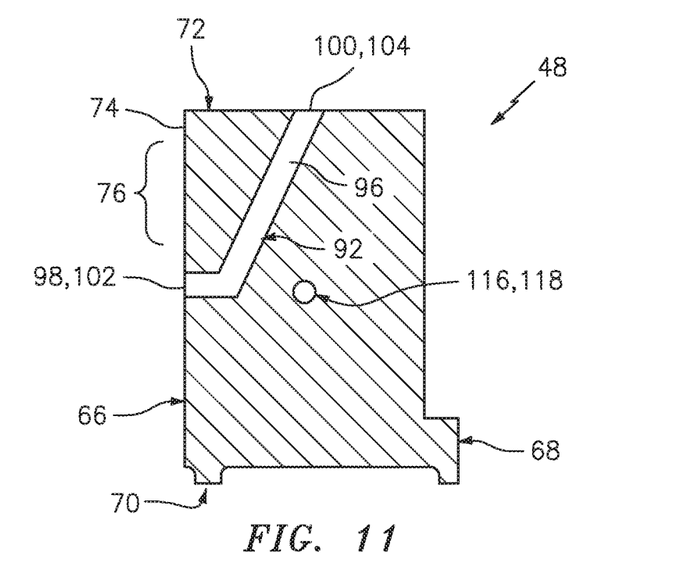
FIG. 11 is a partial sectional illustration of the seal land taken along line 11-11 in FIG. 10.

Referring to FIGS. 10 and 11, in some embodiments, the seal land 48 may be configured without a groove; e.g., the groove 94. For example, the first end orifice 98 of each aperture 96 may be arranged at (e.g., on, adjacent or proximate) the axial first side 66 of the seal land 48; e.g., in the surface 74 below the portion 76.

FIG. 2 is a side cutaway illustration of the gas turbine engine 22, which is configured as a geared turbofan engine. This turbine engine 22 extends along the axial centerline 38 (e.g., the axis 36) between an upstream airflow inlet 122 and a downstream airflow exhaust 124. The turbine engine 22 includes a fan section 126, a compressor section 127, a combustor section 128 and a turbine section 129. The compressor section 127 includes a low pressure compressor (LPC) section 127A and a high pressure compressor (HPC) section 127B. The turbine section 129 includes a high pressure turbine (HPT) section 129A and a low pressure turbine (LPT) section 129B.

The engine sections 126-129 are arranged sequentially along the centerline 38 within an engine housing 130. This housing 130 includes an inner case 132 (e.g., a core case) and an outer case 134 (e.g., a fan case). The inner case 132 may house one or more of the engine sections 127-129; e.g., an engine core. The outer case 134 may house at least the fan section 126.

Each of the engine sections 126, 127A, 127B, 129A and 129B includes a respective rotor 136-140. Each of these rotors 136-140 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 136 is connected to a gear train 142, for example, through a fan shaft 144. The gear train 142 and the LPC rotor 137 are connected to and driven by the LPT rotor 140 through a low speed shaft 145. The HPC rotor 138 is connected to and driven by the HPT rotor 139 through a high speed shaft 146. The shafts 144-146 are rotatably supported by a plurality of bearings 148; e.g., rolling element and/or thrust bearings. Each of these bearings 148 is connected to the engine housing 130 by at least one stationary structure such as, for example, an annular support strut. The rotating component 26 of FIG. 1 may be configured as any one of the shafts 144-146 and the bearing 30 of FIG. 1 may be configured as any one of the bearings 148.

During operation, air enters the turbine engine 22 through the airflow inlet 122. This air is directed through the fan section 126 and into a core gas path 150 and a bypass gas path 152. The core gas path 150 extends sequentially through the engine sections 127-129. The air within the core gas path 150 may be referred to as "core air". The bypass gas path 152 extends through a bypass duct, which bypasses the engine core. The air within the bypass gas 152 path may be referred to as "bypass air".

The core air is compressed by the compressor rotors 137 and 138 and directed into a combustion chamber 154 of a combustor in the combustor section 128. Fuel is injected into the combustion chamber 154 and mixed with the compressed core air to provide a fuel-air mixture. This fuel air mixture is ignited and combustion products thereof flow through and sequentially cause the turbine rotors 139 and 140 to rotate. The rotation of the turbine rotors 139 and 140 respectively drive rotation of the compressor rotors 138 and 137 and, thus, compression of the air received from a core airflow inlet. The rotation of the turbine rotor 140 also drives rotation of the fan rotor 136, which propels bypass air through and out of the bypass gas path 152. The propulsion of the bypass air may account for a majority of thrust generated by the turbine engine 22, e.g., more than seventy-five percent (75%) of engine thrust. The turbine engine 22 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 2), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a piece of rotational equipment, comprising:
   a stationary component;
   a rotating component; and
   a dry seal assembly configured to substantially seal an annular gap between the stationary component and the rotating component, the dry seal assembly comprising a seal element and a seal land;
   the seal element mounted to the stationary component and configured to sealingly engage the seal land; and
   the seal land mounted to the rotating component and configured to permit gas leakage across the dry seal assembly through a passageway in the seal land;
   wherein the seal element engages the seal land in an axial direction.

2. The assembly of claim 1, wherein the passageway includes a plurality of apertures within the seal land, and the plurality of apertures are arranged in an annular array.

3. The assembly of claim 2, wherein the passageway further includes an annular groove fluidly coupled with the plurality of apertures.

4. The assembly of claim 3, wherein
   the rotating component is configured to rotate about an axis;
   the seal land extends axially along the axis to an axial side;
   the seal land extends radially, relative to the axis, to a radial outer side;
   the annular groove is located at the axial side; and an end orifice of a first of the plurality of apertures is located at the radial outer side.

5. The assembly of claim 2, wherein
the rotating component is configured to rotate about an axis;
the seal land extends axially along the axis to an axial side;
the seal land extends radially, relative to the axis, to a radial outer side;
a first end orifice of a first of the plurality of apertures is located at the axial side; and
a second end orifice of the first of the plurality of apertures is located at the radial outer side.

6. The assembly of claim 1, wherein
the rotating component is configured to rotate about an axis;
the passageway extends through the seal land from an inlet to an outlet; and
the inlet of the passageway is located radially inboard, relative to the axis, of an interface between the seal land and the seal element.

7. The assembly of claim 1, wherein the seal element comprises a carbon seal element.

8. The assembly of claim 1, wherein
the seal land is configured with a seal land surface;
the seal element is configured with a seal element surface;
the seal element surface sealingly engages a portion of the seal land surface to form a seal interface between the seal element and the seal land; and
the portion of the seal land surface is circumferentially uninterrupted.

9. The assembly of claim 8, wherein the seal element surface has a radial height that is equal to a radial height of the portion of the seal land surface.

10. The assembly of claim 1, wherein the piece of rotational equipment is a gas turbine engine.

11. An assembly for a piece of rotational equipment, comprising:
a seal land comprising a seal land surface and a passageway, the seal land surface arranged at a side of the seal land and extending circumferentially around an axis, and the passageway extending through the seal land from an inlet at the side of the seal land; and
a seal element comprising a seal element surface, and the seal element configured such that an entirety of the seal element surface sealingly engages a portion of the seal land surface to form a seal interface between the seal element and the seal land;
wherein the seal land is rotatable about the axis relative to the seal element; and
wherein the portion of the seal land surface is circumferentially uninterrupted.

12. The assembly of claim 11, wherein the seal land and the seal element are configured to form a dry seal assembly.

13. The assembly of claim 11, wherein
the passageway includes a plurality of apertures within the seal land; and
the plurality of apertures are arranged in an annular array about the axis.

14. The assembly of claim 13, wherein the passageway further includes a groove fluidly coupled with the plurality of apertures and extending circumferentially about the axis.

15. The assembly of claim 14, wherein the groove is arranged at the side of the seal land.

16. The assembly of claim 11, wherein the seal element is a carbon seal element.

17. The assembly of claim 11, wherein the seal element engages the seal land in an axial direction.

18. The assembly of claim 11, further comprising:
a first component of a gas turbine engine; and
a second component of the gas turbine engine, the first component configured to rotate about the axis relative to the second component;
the seal land attached to the first component; and
the seal element attached to the second component.

19. An assembly for a piece of rotational equipment, comprising:
a seal land comprising a seal land surface and a passageway, the seal land surface arranged at an axial side of the seal land and extending circumferentially around an axis, and the passageway extending through the seal land from an inlet at the axial side of the seal land; and
a seal element comprising a seal element surface, and the seal element configured such that the seal element surface sealingly engages a portion of the seal land surface to form a seal interface between the seal element and the seal land;
wherein the seal land is rotatable about the axis relative to the seal element;
wherein the portion of the seal land surface is circumferentially uninterrupted; and
wherein a radial height of the seal element surface is equal to a radial height of the portion of the seal land surface.

* * * * *